(12) United States Patent
Khouri et al.

(10) Patent No.: US 7,784,995 B2
(45) Date of Patent: Aug. 31, 2010

(54) VEHICLE MOUNTED CONCRETE MIXING DRUM AND METHOD OF MANUFACTURE THEREOF

(76) Inventors: Anthony Khouri, 29 Shoalhaven Road, Sylvania Waters, NSW 2224 (AU); William Rodgers, 10-12 Childs Road, Chipping Norton, NSW 2170 (AU)

( * ) Notice: Subject to any disclaimer, the term of this patent is extended or adjusted under 35 U.S.C. 154(b) by 1209 days.

(21) Appl. No.: 10/516,726

(22) PCT Filed: May 31, 2003

(86) PCT No.: PCT/AU03/00664
§ 371 (c)(1),
(2), (4) Date: Sep. 7, 2005

(87) PCT Pub. No.: WO03/101694
PCT Pub. Date: Dec. 11, 2003

(65) Prior Publication Data
US 2006/0152997 A1 Jul. 13, 2006

(30) Foreign Application Priority Data
May 31, 2002 (AU) .................................. PS 2753

(51) Int. Cl.
*B28C 5/42* (2006.01)
(52) U.S. Cl. .......................................... 366/44; 366/59
(58) Field of Classification Search ................... 366/44, 366/54, 57, 59
See application file for complete search history.

(56) References Cited

U.S. PATENT DOCUMENTS

| | | |
|---|---|---|
| 1,501,566 A | 7/1924 | Lundberg |
| 1,781,965 A | 11/1930 | Ball |
| 1,983,891 A | 12/1934 | Ball |

(Continued)

FOREIGN PATENT DOCUMENTS

CN 1132486 A 10/1996

OTHER PUBLICATIONS

Supplementary European Search Report relating to Application No. EP 04 77 7337, date of completion of the search Nov. 27, 2008 (2 pgs.).

(Continued)

*Primary Examiner*—David L Sorkin
(74) *Attorney, Agent, or Firm*—Foley & Lardner LLP

(57) ABSTRACT

A method of manufacture of a vehicle mounted rotary concrete mixing drum of the type having an opening at one end for receiving and/or discharge of concrete therefrom and at the other end, means for engaging a drive assembly so as to rotate the drum for mixing or discharging concrete. The drum is manufactured from at least one mold using at least one plastics material and further includes integrally attached vanes which outstand from the internal surface of the drum forming an archimedian spiral disposed such that when the drum is rotated in a first direction the concrete contents are mixed and when the drum is rotated in a second direction the contents are discharged from the drum; wherein, the method comprises the steps of;

a) preparing a first generally helical inner mold part containing a surface extending between first and second helical edges;
b) mounting the first helical inner mold part on a support
c) enclosing the inner helical mold assembly within an outer mold formed by at least one outer mold part;
d) fitting a second mating inner helical mold part to the first inner mold part to form an inner mold assembly;
e) injecting a polyurethane elastomer into a cavity defined by said inner mold assembly and the outer mold assembly to form an inner wall element comprising one half of an interior wall of the mixer and one helical blade;
f) allowing said polyurethane to cure;
g) removing said at least one outer mold parts to expose said inner wall element;
h) removing said inner wall element one of said inner molds.

10 Claims, 4 Drawing Sheets

U.S. PATENT DOCUMENTS

| | | | |
|---|---|---|---|
| 1,987,894 A | 1/1935 | Eggert | |
| 2,054,469 A | 9/1936 | Rybeck | |
| 2,073,652 A | 3/1937 | Robb | |
| 2,109,534 A | 3/1938 | Johnson | |
| 2,174,089 A | 9/1939 | Johnson | |
| 2,199,289 A | 4/1940 | Johnson | |
| 2,238,343 A | 4/1941 | Rybeck | |
| 2,303,902 A | 12/1942 | Ball | |
| 2,352,202 A | 6/1944 | Johnson | |
| 2,408,397 A | 10/1946 | Johnson | |
| 2,437,302 A | 3/1948 | Maxon, Jr. | |
| 2,511,240 A | 6/1950 | Bohmer et al. | |
| 2,696,372 A | 12/1954 | Gerst | |
| 3,080,152 A | 3/1963 | Lendved | |
| 3,144,242 A | 8/1964 | Retzlaff | |
| 3,165,789 A | 1/1965 | Jackson | |
| 3,317,194 A | 5/1967 | Heltzel | |
| 3,549,077 A * | 12/1970 | Huck | 228/17.7 |
| 3,592,448 A | 7/1971 | Stevenson | |
| 3,641,730 A | 2/1972 | Meckstroth | |
| 3,664,161 A | 5/1972 | Cressman | |
| 3,700,512 A | 10/1972 | Pearson et al. | |
| 3,717,328 A | 2/1973 | Stevenson | |
| 3,717,916 A * | 2/1973 | Wienand et al. | 29/728 |
| 3,795,121 A | 3/1974 | Cressman | |
| 3,795,364 A | 3/1974 | Kattner | |
| 3,830,899 A | 8/1974 | Piccioli et al. | |
| 3,888,468 A | 6/1975 | Albin | |
| 3,929,321 A | 12/1975 | Sims | |
| 4,064,956 A | 12/1977 | Wildey | |
| 4,086,378 A | 4/1978 | Kam et al. | |
| 4,124,304 A | 11/1978 | Suganuma | |
| 4,137,950 A | 2/1979 | Briscall | |
| 4,223,997 A | 9/1980 | Violet et al. | |
| 4,309,511 A | 1/1982 | Jefferson et al. | |
| 4,363,687 A | 12/1982 | Anderson | |
| 4,366,919 A | 1/1983 | Anderson | |
| 4,391,108 A * | 7/1983 | Albers | 68/143 |
| 4,435,082 A | 3/1984 | Bishop | |
| 4,491,415 A | 1/1985 | Bishop | |
| 4,521,116 A | 6/1985 | Adsit | |
| 4,525,228 A | 6/1985 | Bowen | |
| 4,569,648 A | 2/1986 | Riederer et al. | |
| 4,585,356 A | 4/1986 | Hudelmaier | |
| 4,634,284 A | 1/1987 | Bishop | |
| 4,655,602 A | 4/1987 | Tomlinson | |
| 4,690,306 A | 9/1987 | Staheli | |
| 4,690,988 A | 9/1987 | Hoffman et al. | |
| 4,730,934 A | 3/1988 | Schwing | |
| 4,750,840 A | 6/1988 | Bishop | |
| 4,756,623 A | 7/1988 | Bishop | |
| 4,792,234 A | 12/1988 | Doherty | |
| 4,822,272 A | 4/1989 | Yanase et al. | |
| 4,877,327 A | 10/1989 | Whiteman, Jr. | |
| 4,937,010 A | 6/1990 | Maillat | |
| 5,056,924 A | 10/1991 | Christenson | |
| 5,118,198 A | 6/1992 | Whiteman, Jr. | |
| 5,178,457 A | 1/1993 | Helmy | |
| RE34,505 E | 1/1994 | Whiteman, Jr. | |
| 5,302,017 A | 4/1994 | Platek et al. | |
| 5,326,795 A | 7/1994 | Wykowski | |
| 5,348,387 A | 9/1994 | Gordon et al. | |
| 5,378,061 A | 1/1995 | Christenson | |
| 5,383,581 A | 1/1995 | LeMarbe et al. | |
| 5,388,767 A | 2/1995 | Moses | |
| 5,388,768 A | 2/1995 | Moses | |
| 5,399,192 A | 3/1995 | Yamasoe | |
| 5,411,329 A | 5/1995 | Perry | |
| 5,427,449 A | 6/1995 | Christenson et al. | |
| 5,429,308 A | 7/1995 | Brown | |
| 5,432,211 A | 7/1995 | Morita et al. | |
| 5,441,341 A | 8/1995 | Halsted | |
| 5,460,675 A | 10/1995 | Moser | |
| 5,474,379 A | 12/1995 | Perry | |
| 5,487,604 A | 1/1996 | Moran | |
| 5,492,401 A | 2/1996 | Halsted | |
| 5,570,822 A | 11/1996 | LeMarbe et al. | |
| 5,667,298 A | 9/1997 | Musil et al. | |
| 5,683,177 A | 11/1997 | Hoferichter et al. | |
| 5,739,240 A | 4/1998 | Smith | |
| 5,772,938 A | 6/1998 | Sharp | |
| 5,773,531 A | 6/1998 | Smith | |
| 5,816,702 A | 10/1998 | Mays et al. | |
| 5,839,924 A | 11/1998 | Ritson | |
| 5,908,913 A | 6/1999 | Orthmann et al. | |
| 5,979,794 A | 11/1999 | DeFillipi et al. | |
| 6,021,961 A | 2/2000 | Brown | |
| H1872 H | 10/2000 | Bowman | |
| 6,277,939 B1 | 8/2001 | Smith | |
| 6,329,475 B1 | 12/2001 | Kelly | |
| 6,388,023 B1 | 5/2002 | Hsu et al. | |
| 6,472,069 B1 | 10/2002 | Bailey et al. | |
| 6,500,911 B1 | 12/2002 | Endo et al. | |
| 6,527,203 B2 | 3/2003 | Hurray et al. | |
| 6,583,218 B1 | 6/2003 | Airola et al. | |
| 6,617,417 B1 | 9/2003 | Airola et al. | |
| 6,660,373 B2 | 12/2003 | Hsu et al. | |
| 6,663,021 B1 | 12/2003 | Scarpa et al. | |
| 6,705,538 B2 | 3/2004 | Fecht et al. | |
| 6,800,170 B2 | 10/2004 | Kendall et al. | |
| 6,815,499 B2 | 11/2004 | Yasumura et al. | |
| 6,830,804 B2 | 12/2004 | Hsu et al. | |
| 6,872,337 B2 | 3/2005 | Mellentine et al. | |
| 6,902,311 B1 | 6/2005 | Khouri et al. | |
| 6,938,799 B1 | 9/2005 | Berntsen et al. | |
| 6,951,909 B2 | 10/2005 | Deviny et al. | |
| 7,678,317 B2 | 3/2010 | Khouri et al. | |
| 2002/0022695 A1 | 2/2002 | Ueno et al. | |
| 2002/0071336 A1 | 6/2002 | Smith et al. | |
| 2002/0072574 A1 | 6/2002 | Hsu et al. | |
| 2003/0105177 A1 | 6/2003 | Parfondry et al. | |
| 2006/0167140 A1 | 7/2006 | Altounian et al. | |
| 2007/0159915 A1 | 7/2007 | Daly et al. | |
| 2007/0187434 A1 | 8/2007 | Schrafel | |
| 2007/0189110 A1 | 8/2007 | Khouri | |
| 2008/0225632 A1 | 9/2008 | Khouri | |
| 2008/0259715 A1 | 10/2008 | Harris et al. | |
| 2008/0259716 A1 | 10/2008 | Khouri | |
| 2008/0279035 A1 | 11/2008 | Altounian | |
| 2008/0291771 A1 | 11/2008 | Khouri et al. | |

FOREIGN PATENT DOCUMENTS

| | | |
|---|---|---|
| DE | 956 378 | 1/1957 |
| DE | 956 378 C | 1/1957 |
| DE | 8501010 U1 | 10/1985 |
| DE | 88 01 891 (U1) | 4/1988 |
| DE | 40 10 539 A1 | 10/1991 |
| EP | 0438852 B1 | 1/1996 |
| EP | 0696422 B1 | 6/1999 |
| EP | 0 998 383 B1 | 5/2000 |
| EP | 1238904 A2 | 9/2002 |
| GB | 2 032 793 A | 5/1980 |
| GB | 2032793 A | 5/1980 |
| GB | 2 274 404 A | 7/1994 |
| IL | 148560 | 9/2000 |
| JP | 53-088261 | 8/1978 |
| JP | 53-88261 | 8/1978 |
| JP | 8-114096 A | 5/1996 |
| JP | 8-199052 A | 8/1996 |
| JP | 11-134001 A | 5/1999 |
| JP | 2001-79418 A | 3/2001 |
| RU | 2 052 350 C1 | 1/1996 |
| SU | 421520 | 3/1974 |

| | | | |
|---|---|---|---|
| SU | 977188 A1 | 11/1982 |
| SU | 1796533 A1 | 2/1993 |
| WO | WO 97/32702 A1 | 9/1997 |
| WO | WO 00/64651 | 11/2000 |
| WO | WO 01/26871 A1 | 4/2001 |
| WO | WO 03/101694 A1 | 12/2003 |
| WO | WO 2005/018894 A1 | 3/2005 |
| WO | WO 2005/018895 A1 | 3/2005 |
| WO | WO 2005/018897 A1 | 3/2005 |
| WO | WO 2005/018898 A1 | 3/2005 |
| WO | WO 2005/018899 A1 | 3/2005 |
| WO | WO 2005/025438 A1 | 3/2005 |
| WO | WO 2005/025657 A1 | 3/2005 |
| WO | WO 2005/095073 A1 | 10/2005 |
| WO | WO 2005/113211 A1 | 12/2005 |
| WO | WO 2006/005205 A1 | 1/2006 |
| WO | WO 2006/069285 A2 | 6/2006 |
| WO | WO 2007/061736 A2 | 5/2007 |
| WO | WO 2007/094930 A1 | 8/2007 |

OTHER PUBLICATIONS

Supplementary European Search Report relating to Application No. EP 03 81 8345, date of completion of the search Nov. 26, 2008 (2 pgs.).

Supplementary European Search Report relating to Application No. EP 03 81 8344, date of completion of the search Nov. 26, 2008 (2 pgs.).

Supplementary European Search Report relating to Application No. EP 03 81 8335, date of completion of the search Nov. 26, 2008 (2 pgs.).

Supplementary European Search Report for PCT/AUO300664, date of mailing Jan. 8, 2008, 2 pages.

* cited by examiner

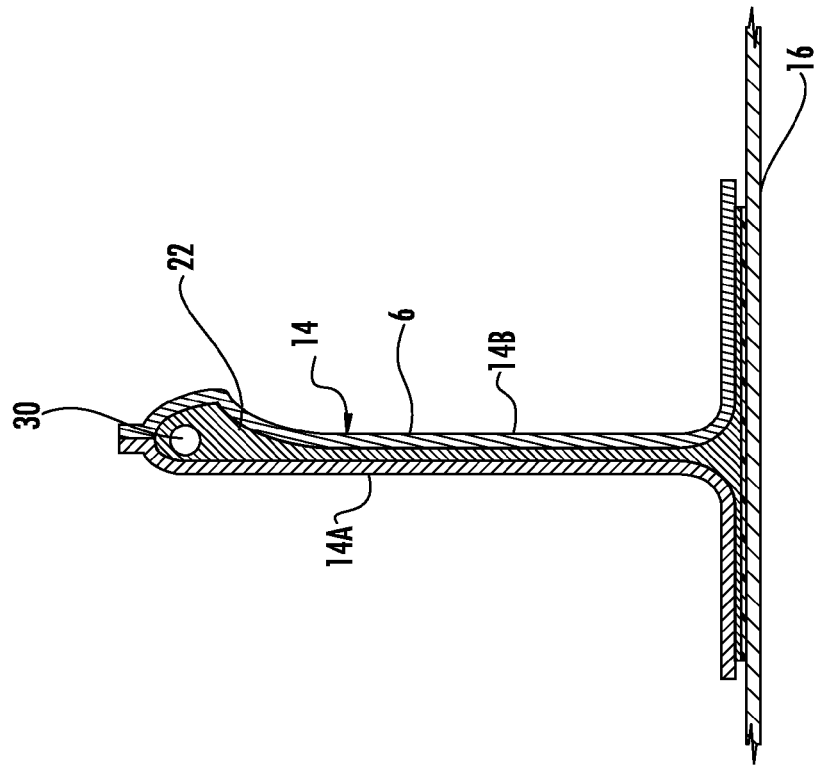
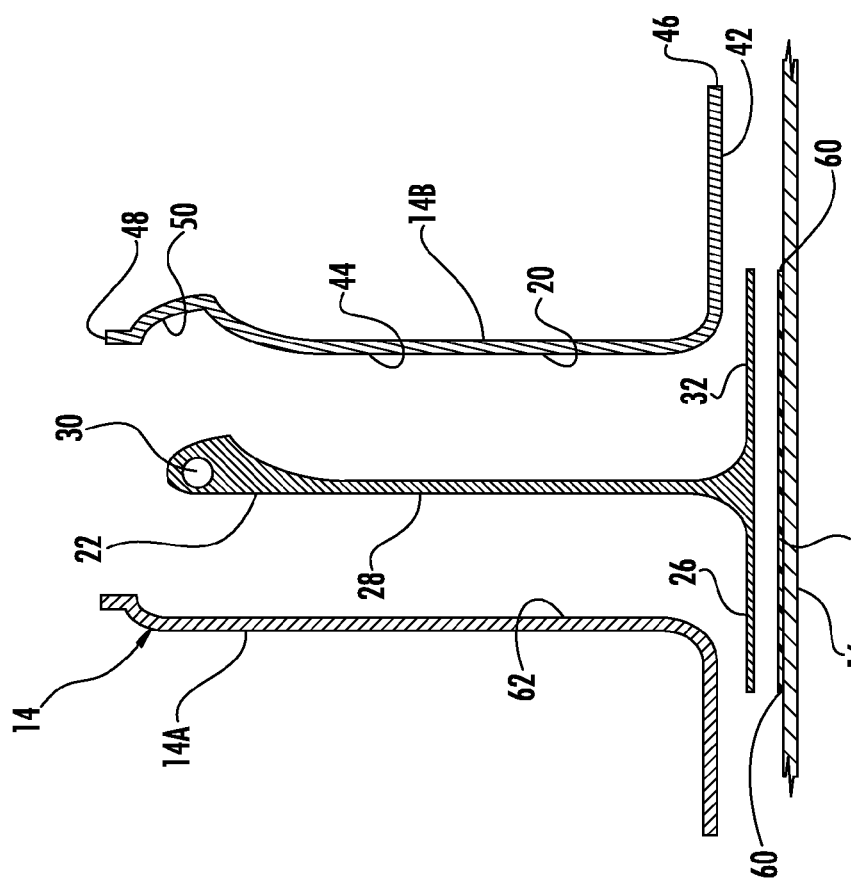

VEHICLE MOUNTED CONCRETE MIXING DRUM AND METHOD OF MANUFACTURE THEREOF

BACKGROUND

The present invention relates to concrete mixing apparatuses and more particularly relates to a vehicle mounted plastics drum for mixing concrete and a method manufacture thereof.

PRIOR ART

The building industry makes widespread use of concrete mixing trucks for transportation of ready mixed concrete to sites for concrete pours. These trucks typically comprise a large mixing assembly including a mixer drum mounted to the vehicle and which is connected to a mixer drive for mixing concrete contents during transportation and for discharge of the contents on site. The drive system comprises a gear box which takes power from the vehicle motor and which applies a mixing torque to the drum imparting axial rotation to the drum with the torque being adjustable depending upon the operating requirements. The above general arrangement is described in U.S. Pat. No. 4,585,356 which discloses a concrete mixer truck having a mixer drum adapted to be rotated by the traction motor of the vehicle through an auxiliary transmission of the traction motor transmission.

According to the known vehicle mounted mixing assemblies, the mixing drum is typically of heavy duty steel construction and is disposed at approximately 10 to 15 degrees from horizontal. The drum is fitted with internal vanes or mixing blades defining an archimedian spiral so that as the drum rotates in a first direction the concrete held therein is mixed and as the drum is rotated in the opposite direction, the concrete is discharged from the drum via an elevated discharge orifice under the reverse action of the internal spiral vanes. The drum is disposed such that the drive end is lowest and the discharge end is highest relative to a generally horizontal plane of the vehicle.

While steel drums have been in use for many years, they suffer from a number of attendant disadvantages relating to their cost of manufacture and replacement, working life, wear characteristics, weight and volume.

Steel drums are expensive to manufacture due to their labor intensive construction which involves rolling steel sheets into conical portions and cylinders which once fabricated are then welded to form the finished tank. The archimedian spirals formed from flat sheets are then welded into position inside the drum. As concrete is a highly abrasive material, internal surfaces of steel drums are subject to significant wear abrasion. This occurs particularly on the surfaces which take slump impact, sliding friction and shear load leading to eventual wearing out of the drum.

Typically, a steel drum used every day might last three to five years, thereafter requiring replacement at significant cost. The abrasion of internal surfaces is increased where there are changes of slope in the drum walls usually where the segments of the drum are joined.

The mixing blades are welded to the internal surface of the drum causing sharp angled recesses in which concrete can gather and eventually build up degrading the internal surface and providing a catchment for further unwanted build up of concrete. By its nature, a steel surface is relatively smooth and whilst this may be desirable for the purpose of preventing concrete build up on the walls of the drum, the interface between the concrete and steel wall is an area of abrasion rather than concrete mixing.

Ideally, mixing of concrete should take place throughout the whole mix, but in the steel drums, optimum mixing does not take place at the boundary layer and in crevices in which concrete may collect. In fact, due to the nature of the frictional interface between the steel surface and concrete boundary layer, laminar flow occurs resulting in little or no mixing at the boundary layer. The reason for this is that the aggregate in the concrete slides and abrades (with reduced or no mixing) rather than rotates to facilitate mixing. Thus there are 'dead' spots in the mix where no mixing takes place and where there is an increased potential for unwanted collection of concrete. In addition to the above problems associated with the use of steel mixing drums, there are cost and weight factors which add to inherent inefficiencies in use of steel drums. Due to the dead weight of the steel drum, its volume must be restricted so the combination of the dead weight and concrete weight must be maintained within the maximum allowable loading limits for the vehicle to which the drum is attached.

An alternative to the known steel drums was proposed in PCT International patent application PCT/AU00/01226 to Rodgers and Khouri. That application teaches the possibility of using a lightweight material such as plastics for construction of a concrete mixing drum as a substitute for steel whilst recognizing that there were numerous structural and manufacturing difficulties to be overcome in making the transition to plastics not the least of which was the production of a drum which could withstand the high static and dynamic loadings to which truck mounted mixing drums are subject to in normal operation. If the weight of the drum could be reduced without compromising and possibly increasing drum volume, the weight reduction could be taken up with additional concrete thereby increasing the pay load.

There are variety of concrete mixing drum arrangements disclosed in the prior art none of which as far as the inventor is aware anticipate the method of manufacture of a plastics drum to be described herein.

U.S. Pat. No. 4,491,415 discloses a lightweight, pear shaped rotary mixing device open at one end and having an axially elongated socket at the large end. The drum is rotatably supported on a unitary base having a transversely extended forward end and an upwardly and angularly extending rear end providing a bearing portion detachably engagable with the socket to rotatably support the drum at an inclination of about 35 degrees. The drum has a plurality of axially extending radial fins for lifting contents in rotation thereof and is preferably fashioned from molded plastics material either as a unitary body or as a plurality of intermitting parts. The drum described in this patent is for light duty operation and does not have the structural and materials characteristics necessary for heavy duty concrete mixing operations.

U.S. Pat. No. 5,118,198 discloses a cement mixing apparatus with a cradle support assembly and including a polyethylene cement mixing drum held and supported by a cradle arm assembly formed of cradle base support braces and upright cradle arms which interfit into cradle arm recesses which are preformed with the polyethylene drum. A bull gear drives the polyethylene drum. The drum disclosed in this patent is intended for light duty cement operations and does not address the structural and manufacturing requirements for heavy duty operations. U.S. Pat. No. 5,492,401 discloses a concrete mixer with a mixing drum consisting of high density crosslinked polyethylene material. The drum includes a bottom supported buy a conventional rigid metal pan secured to the external surface thereof to rigidify the plastic drum and extend the life expectancy of the plastic drum by enabling the concrete mixer to be used to complete a mixing job at a job site even though movement of the concrete mix within the drum during repetitive mixing cycles may ultimately wear a hole through the bottom of the plastic drum. Paddle assemblies are positioned interiorly of the drum and oriented to maintain minimum splashing during the mixing operation. Not only is the drum disclosed in this patent unsuitable for heavy duty vehicle mounted operation the patent in fact teaches a means to accommodate a wear failure on site whereby a hole could be worn through the wall of the drum.

The prior art teaches use of plastics drums for small cement mixing operations. However there are inherent difficulties in manufacturing plastic drums to an acceptable standard of strength and reliability. Plastics drums require use of materials which for a drum profile by use of a mould. As the discharge opening to a drum is narrower than the remainder of the drum, it is not possible to remove a mould from an inner surface unless the drum is made in sections which can be joined to form the drum structure. A number of methods of manufacture of plastics heavy duty mixing drums have been proposed in PCT application PCT/AU00/01226 which discloses a heavy duty rotary concrete mixing drum for attachment to a vehicle which is characterized in that the drum is manufactured from at least one mould and from at least one plastics material and wherein the drum includes an inner surface having a property which promotes mixing of the concrete at the boundary layer between the concrete and said inner surface and reduces wear.

A number of different methods were proposed in that application for the manufacture of a drum of the type disclosed.

INVENTION

The present invention seeks to provide an alternative method of construction of a heavy duty vehicle mounted rotating cement or concrete mixing drum fabricated from plastics materials. The drum produced by the method of the invention described herein overcomes the aforesaid disadvantages of the prior art and maintains efficient concrete mixing characteristics. According to the invention there is provided a method of construction of a plastics concrete mixing drum wherein the method includes the use of inner and outer molds each made up from separate mould parts which are divided along two helical lines mid way between the mixing blades thereby allow formation of a drum interior from two identical molds.

In one broad form the present invention comprises:

a method of manufacture of a vehicle mounted rotary concrete mixing drum of the type having an opening at one end for receiving and/or discharge of concrete therefrom and at the other end, means for engaging a drive assembly so as to rotate the drum for mixing or discharging concrete; wherein, the drum is manufactured from at least one mould using at least one plastics material; wherein the drum further includes integrally attached vanes which outstand from the internal surface of the drum forming an archimedian spiral disposed such that when the drum is rotated in a first direction the concrete contents are mixed and when the drum is rotated in a second direction the contents are discharged from said drum; wherein, the method comprises the steps of;

a) preparing a first generally helical inner mold part containing a surface extending between first and second helical edges;

b) mounting the first helical inner mould part on a support c) enclosing the inner helical mold assembly within an outer mould formed by at least one outer mold part;

d) fitting a second mating inner helical mold part to the first inner mould part to form an inner mold assembly;

e) injecting a polyurethane elastomer into a cavity defined by said inner mold assembly and the outer mould assembly to form an inner wall element comprising one half of an interior wall of the mixer and one helical blade;

f) allowing said polyurethane to cure;

g) removing said at least one outer mold parts to expose said inner wall element;

h) removing said inner wall element one of said inner molds;

The method preferably comprises the additional step of placing a reinforcing member in a recess formed in said inner mold part. Steps a)-h) are repeated thereby providing a second helical inner wall element. The first and second helical inner wall elements are complimentary and combine to form an inner wall surface of the mixing drum. The first and second helical inner wall elements are then preferably placed into a jig where opposing edges of said elements are held adjacent; the wall elements defining an inner cavity of said drum. Opposing edges of the elements are sealed to complete the inner wall of the drum. The inner wall is removed from the jig and placed the inner wall on a mandrel such that the mandrel is disposed in the inner cavity. The inner wall is placed on the mandrel via an open end of the inner wall whereupon structural layers of glass fibre reinforced plastic are applied to the polyurethane inner layer. Preferably, the internal surface of the drum includes an elastomer which will allow mixing of the contents of the concrete at a concrete boundary layer;

The reinforcing member is preferably a continuous rope inserted in a recess in a formation which will form helical blades.

The method includes the use of inner and outer molds each made up from separate mould parts which are divided along two helical lines thereby allowing formation of a drum interior wall from two complementary mould parts.

In another broad form the present invention comprises:

a method of manufacture of a vehicle mounted rotary concrete mixing drum of the type having an opening at one end for receiving and discharge of concrete therefrom and at the other end means for engaging a drive assembly so as to rotate the drum for mixing or discharging concrete; wherein, the drum is manufactured from at least one inner mould and at least one opposing outer mould; wherein the drum includes integrally attached vanes which outstand from the internal surface of the drum forming an archimedian spiral disposed such that when the drum is rotated in a first direction the concrete contents are mixed and when the drum is rotated in a second direction the contents are discharges from said drum; and wherein the internal surface of the drum is formed or lined with an elastomer which causes mixing of the contents of the concrete at the concrete boundary layer; wherein the method comprises the steps of;

a) preparing a first inner helical mold containing a surface intermediate side edges of the mould;

b) placing a reinforcing rod in a recess in said inner mold;

c) enclosing the inner helical mold assembly within at least one outer mold part;

d) sealing a joint between said inner mold part and said at least one outer mold part;

e) injecting a polyurethane elastomer into a cavity defined by said inner mold and said at least one outer mold part to form an inner helical wall element comprising one half of an interior of the mixer and one helical blade;

g) allowing said polyurethane to cure;

h) removing said at least one outer mold parts;

i) removing one of said inner molds;

j) removing the interior polyurethane inner helical wall element molding from the remainder of the inner mold assembly;

k) repeating steps a)-j) to form a second inner wall element.

Preferably when a first and a second inner wall element are placed in a jig jointing surfaces are held adjacent to enable sealing the join formed by the jointing surfaces.

According to a preferred embodiment, a mandrel is inserted into an open discharge end of a drum interior following which structural layers of glass fibre reinforced plastics are wound about an outer surface of the inner wall.

In another broad form the present invention comprises:

a method of construction of a plastics mixing drum comprising the steps of:

a) preparing a first inner mold containing a surface extending from a joint line midway between two helical blades to a mid line mould joint line at an inner edge of said blades;

b) placing a reinforcing rod in a recess in said inner mold;

c) fitting a second mating inner helical mold to form an inner mold assembly;

d) enclosing the inner helical mold assembly within at least one outer mold part;

e) sealing a joint between said inner mold assembly and said at least one outer mold part;

injecting a polyurethane elastomer into a cavity defined by said inner mold assembly and said at least one outer mold part to form one half of the interior of the mixer and one of the helical blades;

f) allowing said polyurethane to cure;

g) removing said at least one outer mold parts;

h) removing one of said inner molds;

i) removing the interior polyurethane molding from the remainder of the inner mold assembly;

j) placing said two helical blade and interior moldings in a jig where the jointing surfaces are held adjacent;

k) inserting a mandrel into an open discharge end of the drum;

l) applying structural layers of glass fibre reinforced plastic the polyurethane layer.

Preferably the reinforcing is fitted using spacers which centralize the reinforcing rod or rope in its recess. Preferably the first and second inner helical mold elements are jointed with a sealing compound or gaskets along an inner edge.

According to one embodiment, the outer mold is formed in three separate mold parts.

Preferably, a joint between the two inner helical elements forming a helical blade is made with a polyurethane elastomer compound.

In another broad form the present invention comprises:

a method of manufacture of a vehicle mounted concrete mixing drum comprising the steps of;

a) taking a helical inner mould part and mounting the mould on a support;

b) placing at least one external mould in opposing relationship to said inner mould;

c) injecting a flowable material into a space formed between said inner mould and said outer mould such that the flowable material forms a helical element which will form at least part of an inner surface of said drum;

d) removing the at least one outer mould;

e) removing the helical element from said inner mould;

f) repeating steps a)-e) so as to form a second helical element;

g) preparing an exterior surface of the helical elements for bonding to a structural layer of glass fibre.

Preferably, the flowable material is polyurethane.

In another broad form of an apparatus aspect the present invention comprises a vehicle mounted rotary concrete mixing drum of the type having an opening at one end for receiving and/or discharge of concrete therefrom and at the other end, means for engaging a drive assembly so as to rotate the drum for mixing or discharging concrete; wherein, the drum is manufactured from at least one mould using at least one plastics material; wherein the drum further includes integrally attached vanes which outstand from the internal surface of the drum forming an archimedian spiral disposed such that when the drum is rotated in a first direction the concrete contents are mixed and when the drum is rotated in a second direction the contents are discharged from said drum; wherein, the drum is formed by a method comprising the steps of;

a) preparing a first generally helical inner mold part containing a surface extending between first and second helical edges;

b) mounting the first helical inner mould part on a support c) enclosing the inner helical mold assembly within an outer mould formed by at least one outer mold part;

d) fitting a second mating inner helical mold part to the first inner mould part to form an inner mold assembly;

e) injecting a polyurethane elastomer into a cavity defined by said inner mold assembly and the outer mould assembly to form an inner wall element comprising one half of an interior wall of the mixer and one helical blade;

f) allowing said polyurethane to cure;

g) removing said at least one outer mold parts to expose said inner wall element;

h) removing said inner wall element one of said inner molds;

In another broad form of the apparatus aspect, the present invention comprises:

a vehicle mounted concrete mixing drum formed by a method of manufacture comprising the steps of;

a) taking a helical inner mould part and mounting the mould on a support;

b) placing at least one external mould in opposing relationship to said inner mould;

c) injecting a flowable material into a space formed between said inner mould and said outer mould such that the flowable material forms a helical element which will form at least part of an inner surface of said drum;

d) removing the at least one outer mould;

e) removing the helical element from said inner mould;

f) repeating steps a)-e) so as to form a second helical element;

g) preparing an exterior surface of the helical elements for bonding to a structural layer of glass fibre.

Preferably the flowable material is polyurethane.

According to one embodiment the helical blades projecting from an inner surface of said drum have a pitch dimension of between 1-2 meters and are formed by elastomeric material. Preferably the wall strength of said drum is around 600 MPa at a wall thickness of 8 mm. Preferably the polyurethane forms an inner layer which is approximately 3 mm thick.

Preferably the structural layer comprises filament windings forming a layer of approximately 5 mm thickness.

In another broad form the present invention comprises;

a heavy duty rotary concrete mixing drum capable of attachment to a vehicle; the drum comprising a first end which engages a drive assembly which rotates said drum for mixing of said concrete and a second end from which mixed concrete is discharged; wherein said drum is manufactured from at least one layer of plastics material wherein the drum includes a wall having integral internal formations which promote mixing of said concrete and an inner surface which promotes mixing of the concrete at the boundary layer between the concrete and said inner surface; wherein the drum is formed according to the method steps of:

a) taking a helical inner mould and mounting the mould on a support;

b) placing at least one external mould in opposing relationship to said inner mould;

c) injecting polyurethane into a space formed between said inner mould and said outer mould;

d) removing the at least one outer mould;

e) removing a helical blade part from said inner mould;

f) repeating steps a)-e) so as to form a second helical blade part;

g) mating the first and second helical blade parts with an interior shell;

g) preparing an exterior of the drum for bonding to a structural layer of glass fibre;

h) winding the structural layer about said exterior.

DETAILED DESCRIPTION

The present invention will now be described according to a preferred but non limiting embodiment and with reference to the accompanying illustrations wherein:

FIG. 3a shows an enlarged view of external moulds exploded from a helical blade part;

FIG. 3b shows an enlarged view of the assembly of FIG. 3a with outer mould parts moulds assembled.

The concentrated wear points in the prior art steel drums reduces the working life of the drums necessitating costly repair or replacement. Steel drums are fabricated from rolled flat sheets which form cones and a cylinder which are then joined together by welding. Archimedian spirals are then welded to the inner surface of the drum resulting in a high specific gravity vessel whose self weight reduces the amount of concrete which can be carried by the vehicle to which it is attached. The steel drums suffer from a number of disadvantages including susceptibility to abrasion at the junctions of the cylindrical and conical sections and the tendency for unwanted concrete build up at the sharp corners and crevices formed by the mixing blades. In addition, the smooth internal surface of the steel drum promotes sliding abrasion and inhibits mixing at the boundary layer due to the low coefficient of friction at the concrete/metal interface.

The method to be described below is an alternative to both steel drums and the plastics drums formed by the methods of manufacture described in International Patent application No. PCT/AU00/01226 to Rodgers and Khouri. According to the method, a plastics heavy duty concrete mixing drum is formed using both internal and external moulds. The drum includes an internal archimedian spiral formed by helical blades or vanes which mix concrete during rotation of the drum in one direction and discharge concrete when the drum is rotated in an opposite direction. The drum is generally pear shaped and includes an opening at one end for entry and discharge of concrete.

The first step in the method according to one embodiment, involves the use of an internal mould. A polyurethane drum interior complete with internal helical blades is formed between an interior and an exterior mould set. The exterior moulds are easily removed after the polyurethane is formed, however because the mixer is a closed vessel with the discharge opening smaller than the maximum diameter, and due to the complexity of the blade moulds, it is not possible to form the interior as one complete piece and then remove the mould. Accordingly, the elastomeric drum interior is moulded in sections which can be removed from the moulds, and then joined to form the complete interior. This interior is then reinforced with structural layers to complete the mixer. The joining together of two complementary inner wall sections which are each formed by the same method steps sequentially is a new approach to forming a drum interior not known in the prior art.

Figure 1:
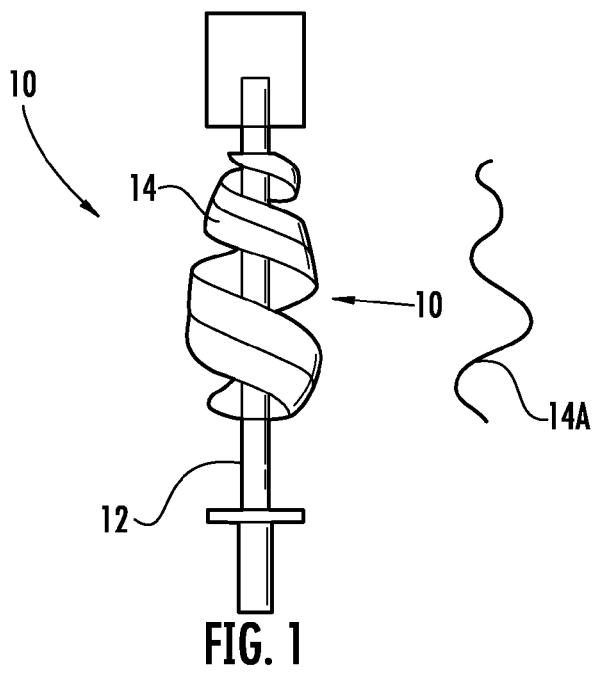
FIG. 1 shows a side elevation of an inner helical mould part.
Figure 2:
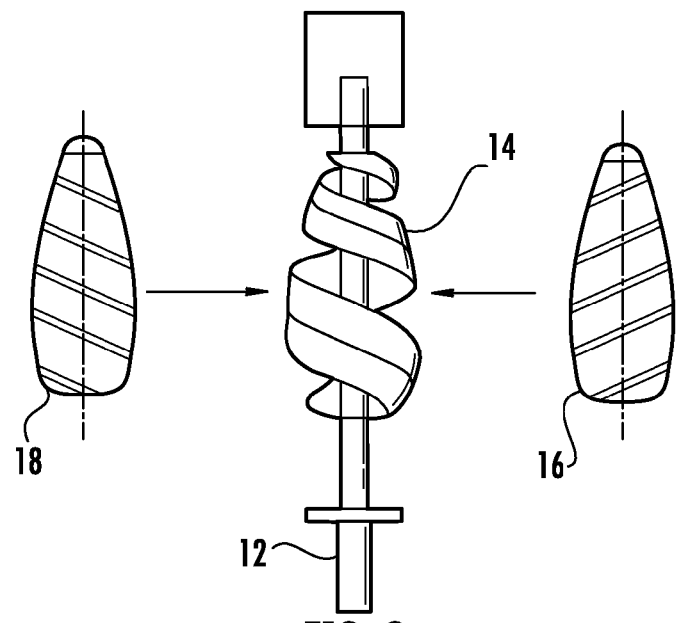
FIG. 2 shows a side elevation of the mould part of FIG. 1 including exploded external moulds.

Referring to FIG. 1 there is shown an assembly 10 which comprises a support 12 which receives and retains thereon a helical inner mould assembly 14. Mould assembly 14 is shown in profile by line [4] 14A. Mould assembly 14 is initially prepared in a separate mould having a helical interior so that mould 14 conforms to the shape of that interior. Once mould assembly 14 is formed, it may be transferred manually or otherwise for mounting on support 12 in preparation for receiving external mould[s] parts 16, 18 (shown in FIG. 2). FIG. 2 shows a side elevation of the mould assembly 14 of FIG. 1 with exploded opposing external mould parts 16 and 18.

Figure 3:
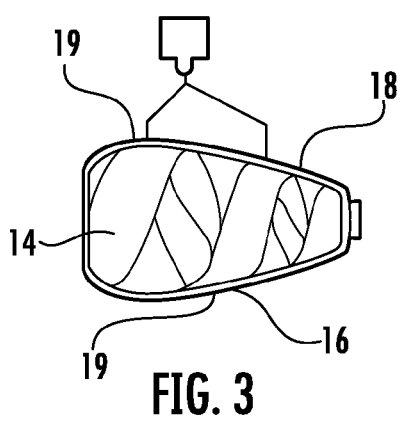
FIG. 3 shows a side view of the inner mould part of FIGS. 1 and 2 fully enclosed by external mould sections

As shown by FIG. 3, mould parts 16 and 18 encapture mould assembly 14 but leave a generally helical cavity therebetween. Once external mould parts 16 and 18 have been secured and sealed, polyurethane is injected into the aforesaid cavity 19. It will be appreciated by persons skilled in the art that more than two external moulds 16, 18 may be used to fulfill the same objectives of encapsulating inner mould 3. FIG. 3 shows a side view of the inner mould assembly 14 enclosed by external mould sections or parts 16 and 18.

FIG. 3a shows an enlarged view of inner mould[s] assembly parts 14A and 14B exploded from inner mould assembly 14 and outer mould 16 revealing a section view of a part helical spiral or element 20 retrieved from the cavity 19 defined by inner mould[s] parts 14A and 14B and outer mould 16 following injection of polyurethane.

FIG. 3b shows an enlarged section view of the assembly of FIG. 3a with moulds 14 and 16 assembled. Mould parts 14A, 14B and mould 16 are shown in FIG. 3b in abutting relationship with molded part, which is formed by injection of a polyurethane elastomer into a cavity 19 formed between moulds 14, 16 and 18.

Figure 4:
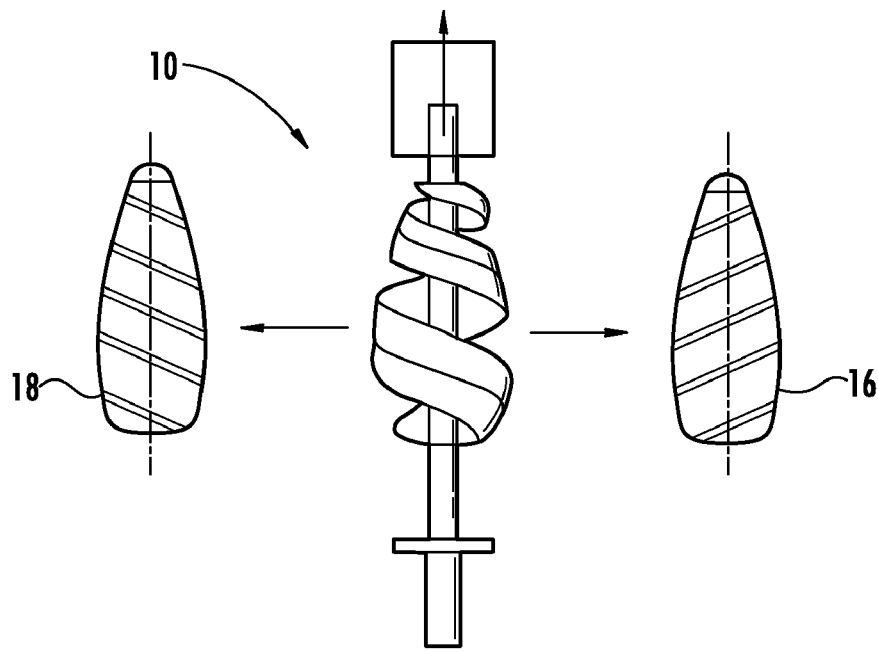
FIG. 4 shows outer mold sections exploded from the inner mould assembly upon completion of injection of an elastomer.
Figure 5:
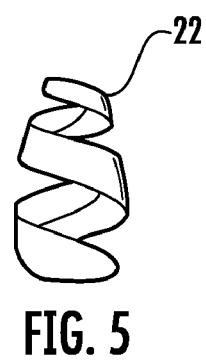
FIG. 5 shows a helical blade part produced by and removed from the inner mould assembly of FIG. 4.
Figure 6:
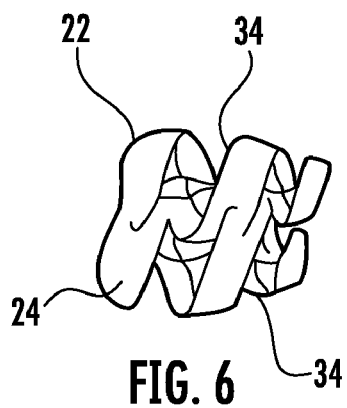
FIG. 6 shows a coupling of separate and complementary helical blade parts formed by the arrangements of FIGS. 1-5 and which form an inner wall of the drum.

Referring to FIG. 4 there is shown outer mold sections 16 and 18 exploded from the inner mould assembly 14 upon completion of injection of an elastomer. Upon removal of inner mould sections or parts 14A, 14B, helical (or element) [8] 20 which has been formed from the elastomeric material injected into the cavity defined by assembled external mould [s] parts 16, 18 and mould 14 as shown in FIG. 3 may be released. FIG. 5 shows a first helical element 20 formed in a first helical (archimedian) spiral. The above described process is repeated once again to form a second helical (archimedian) helical element 24. Helical element 22 forms one half of a completed shell having blades 28 which are integrally disposed on an inner surface 32 of the drum 72 formed by the processes described herein. A repeat of steps described with reference to FIGS. 1-5 result in a second helical inner element [9] 24 which co operates with and is complementary to helical element [8] 22 to form a completed inner wall 26 including integral helical blade 28. FIG. 6 shows a pair of helical sections 22 and [9] 24 formed by the assembly and process as described with reference to FIGS. 1-5. Sections 22 and [9] 24 are in the form of two parallel helical spirals spaced at 180 degree axial phase difference each with a reinforcing rod 30 (see FIGS. 3a and 3b) in the interior edge, which may be a continuous filament and resin rope. As these blades 28 are integral with the interior surface 32 of the mixer, it is convenient to join these two structures along two helical lines 34 mid way between the blades 28. In this way the interior is formed as two identical mouldings or sections 22, 24 which can be removed from the interior mould 14 and exterior mould sections 16, 18 and which also contain the complete reinforcing rods 30.

As shown by FIGS. 3a and 3b, the moulds 16, 18 contain a layer 38 of glass reinforced plastic which bonds to the polyurethane of elements 22, 24 which is are formed, against it. In this way the two mouldings or sections 20, 24 are formed with two helical jointing lines 34 mid way between the blades 28 and a stiff inner shell 40 ready to receive the structural layers 42 is formed.

According to one embodiment, a preferred method of manufacturing the mixer is as follows.

As shown by FIGS. 3a and 3b, inner helical mould 14B includes surfaces 42, 44 which extend[s] from a joint line 46 mid way between two formed helical blade (28) to a mid-line mould joint line 48 at an inner edge of the blade 28. Surface 44 faces towards the drive end of the mixer and contains a recess 50 for the reinforcing rod or filament rope 30. The next step is fitting reinforcing rod 30 with polyurethane spacers (not shown), which centralize the rod 30 in a recess 50 between inner mould 14A, 14B.

A mating helical mould 14A is prepared, fitted and is joined with sealing gaskets (not shown) to mould 14b along their inner edge 48. The helical mould 52 is formed by moulds 14A, 14B and mould 16, the surfaces of which are pre coated with a layer 58 of glass fibre reinforced plastic, to provide an interior moulding 58 to the polyurethane elastomer. Seals 60 are incorporated into a joint formed between the mould 16 and moulds 14A, 14B. Following this the polyurethane elastomer is moulded into the cavity 62 formed between the moulds 14, 16. The elastomer polymerizes to form section 20 which comprises half the interior layer of the mixing drum 64. The polyurethane is allowed to cure whereupon moulds 14A, 14B and 16 are removed to expose an inner shell and outer surface of the polyurethane section 20. This allows removal of the helical section 20, the interior polyurethane moulding. The above process is repeated to provide a second helical section 24, having blade 28 and interior wall moulding 26.

Figure 7:
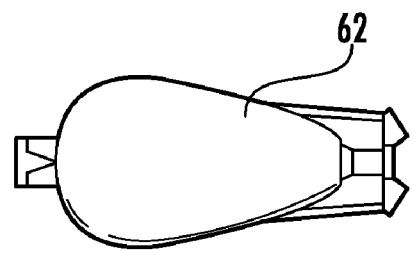
FIG. 7 shows a housing for assembly in which the inner wall of the drum is placed after moulding helical blade parts for preparation of the blade parts to receive an outer structural layer.
Figure 8:
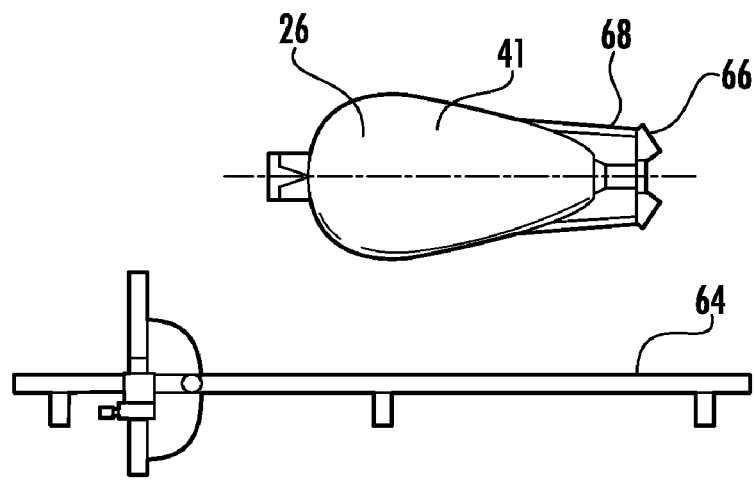
FIG. 8 shows an assembly including a mandrel for mounting said inner payer for applying an outer structural layer of glass fibre.

The two helical section 22 and [9] 24 are then assembled in a jig 62 as shown in FIG. 7 whereupon they are joined together using a polyurethane elastomer compound. An inflation pressure is applied to the interior of the mixer to ensure it conforms to the interior of the jointing jig 62. The top half of the jig 62 is removed and the external surface of the polyethylene joints is covered with glass fibre reinforced plastics. Following that, the external surface of the moulded polyurethane interior of the mixer is prepared for bonding to the structural layer. At this stage of the processing a drive ring is applied to the polyurethane layer which will form the inner layer or wall 26 of the mixing drum. The jig 62 is removed and the now formed inner layer 26 of the drum is transferred to a winding station 64 as shown in FIG. 8.

A steel mandrel 66 is inserted into the open (discharge) end 68 of the mixer so that it reaches the drive ring (not shown) which is common to heavy duty drums of this type. The drive ring which imparts rotation to the mixer is spigotted and drilled to suit a gear box flange (not shown). The glass fibre reinforced plastic exterior of the polyurethane interior 26 is bonded to the drive ring and allowed to cure. The glass fibre reinforced plastic exterior 70 is extended over the discharge end support flange which then forms an enclosed vessel against the mandrel.

Structural layers of glass fibre reinforced plasticare applied by one of the known methods standard to the industry such as:

a) Contact moulding of random and/or directional glass fibres and resin.

b) Filament winding.

c) Surface finishing by filling and grinding or/Moulding a gel coat finish using vacuum or pressure.

Figure 9:
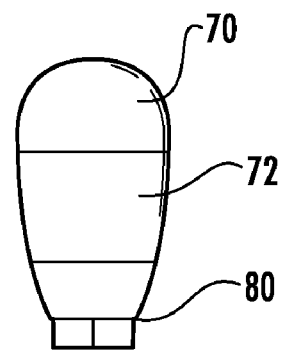
FIG. 9 shows a completed drum with track ring fitted.

The winding step is conducted by winding device 64 after drum inner layer is mounted on mandrel 66. (see FIG. 8). As represented by FIG. 9, the final step in the construction of the drum involves the installation of the track ring 80.

These are known in conventional heavy duty drums and comprise a cylindrical rail attached to the mixer adjacent to the discharge end and which is supported by two rollers to allow the mixer to be rotated by the gearbox at the drive end. The ring is held in position with rubber gaskets (not shown) which seal to the mixer and this space between the ring and the mixer is filled with a liquid polyurethane which bonds to both as it gels and cures.

In operation this elastomer transmits the loads from the mixer shell to the steel track ring and hence to the steel support rollers. In this way the concentrated loads are spread and only low stresses are transmitted via the elastomer to the mixer shell.

According to one embodiment, a computer may be employed to program and control the delivery of the polymer to the mold surface and the application of the structural layer.

The winding of a fibre reinforced structural layer may involve computer controlled unwinding of resin wetted fibre rovings from around a rotating former. The tensile strength of the windings may be in the order of 600 MPa. To obtain the optimum physical properties of the filament wound structure the fibres are aligned to the loads imposed in use of the finished drum. Typical loadings on the drum are axial bending under weight of wet concrete, an applied dynamic load at the drive end of the drum, driving torque and support loads at discharge end trunion rolls. The winding pattern of the filaments 70 aligns the fibres to withstand bending stresses, increasing in angle and in wall thickness towards the discharge end to accommodate applied roller loads.

The rovings 70 which line the drum may alternatively be drawn through the resin bath and applied to the surface of the drum as a wide ribbon comprising thousands of tensioned fibres. The windings 70 overlap until the required thickness is reached. The surface of the drum may be covered with wet resin and small irregularities which need to be addressed to provide the external finish. As a result of this construction, the spiral mixing blades 28 inside the drum are capable of withstanding high bending and shear resistance during mixing operations. The inner elastomeric surface 32 is highly resistant to abrasion by concrete yet it is softer and lighter than the steel equivalent. The higher resistance to abrasion is facilitated by the natural elastic deformation of the elastomer which absorbs the kinetic energy of the concrete particles without gouging of the surface material. In addition, due to the property of the inner surface which will preferably be polyurethane, the concrete will be mixed rather than slide at the boundary layer ensuring efficient mixing of the concrete throughout the mix and reduction of abrasion due to the smooth curves throughout the interior of the drum.

Furthermore, the blades 28 are strengthened by their molding integrally with the wall 26 of the drum and have a stiffness factor which will sustain all applied normal operating loads.

A further advantage in the use of plastics for the mixing drums lies in the thermal properties of the plastics material. Hot conditions are undesirable for concrete mixing as they accelerate hydration reducing concrete workability which is an essential property required immediately following a concrete pour. In very hot climates, the conventional steel vehicle mounted mixing drums conduct high heat loads which increase heat at the concrete boundary layer due to contact with the super heated drum wall causing unwanted accelerated hydration. This phenomenon is difficult to avoid with steel drums as the conductivity of steel leads to high conductive heat transfer from the outer skin of the drum to the inner wall which is normally in contact with the concrete. In some hot climates, ice is placed in the steel drums in an attempt to arrest temperature increase inside the drum. As concrete hydration is an exothermic reaction, it is sensitive to external temperatures. Accordingly it is desirable that the concrete temperature remains acceptably low to ensure a satisfactory level of workability and to retard hydration. Steel drums heat up significantly and conduct heat through their thickness making the concrete vulnerable to the vagaries of temperature variation. Overheating of the concrete mix is a problem to be avoided and has in accordance with one aspect provided a method of manufacture of a plastics drum to take the place of the conventional steel drums thereby reducing the unwanted effects of high thermal conductivity typical of the steel drums. The plastics drum allows the concrete to remain workable inside the drum for longer periods compared to concrete in steel mixing drums under the same external temperature conditions and transporting concrete.

The method of construction of a plastics concrete mixing drum as described herein provides an alternative yet efficient method of production of plastics drums. The methods described herein allow for mass production with reduction in the number of production steps compared to the known methods.

It will be recognized by persons skilled in the art that numerous variations and modifications may be made to the invention as broadly described herein without departing from the overall spirit and scope of the invention.

The claims defining the invention are as follows:

1. A concrete mixing drum comprising:
   a first molded polymeric helical wall element; and
   a second molded polymeric helical wall element joined to the first molded polymeric helical wall element, wherein the first molded polymeric helical wall element and the second molded polymeric helical wall element form a substantially continuous common wall circumferentially extending about a longitudinal axis to form an interior of the drum, and wherein the first helical wall element and the second helical wall element are joined along a helical seam.

2. The drum of claim 1 wherein the first molded polymeric helical element includes an integrally formed blade disposed proximate a mid-line of the first molded polymeric helical element.

3. The drum of claim 2 wherein the second molded polymeric helical element includes an integrally formed blade disposed proximate a mid-line of the second helical element.

4. The drum of claim 3 wherein the blades are helical, and the helical seam is disposed mid way between the blades.

5. The drum of claim 2 including a reinforcing member within a tip of the blade.

6. The drum of claim 1 including a second substantially continuous layer extending across a junction of the first molded polymeric helical wall element and the second molded polymeric helical wall element.

7. The drum of claim 6 wherein the second continuous layer is a fibre reinforced elastomer.

8. The drum of claim 1 wherein the first molded polymeric helical wall is an integrally molded one-piece member that forms one half of a shell of the mixing drum.

9. The drum of claim 8 wherein the second molded polymeric helical wall is an integrally molded one-piece member that forms a second half of the shell of the mixing drum.

10. The drum of claim 5 wherein the reinforcing member comprises a continuous filament and resin rope.

* * * * *